Dec. 27, 1938.  A. DU BOIS  2,141,738
FILLING AND WEIGHING MACHINE
Filed March 12, 1936
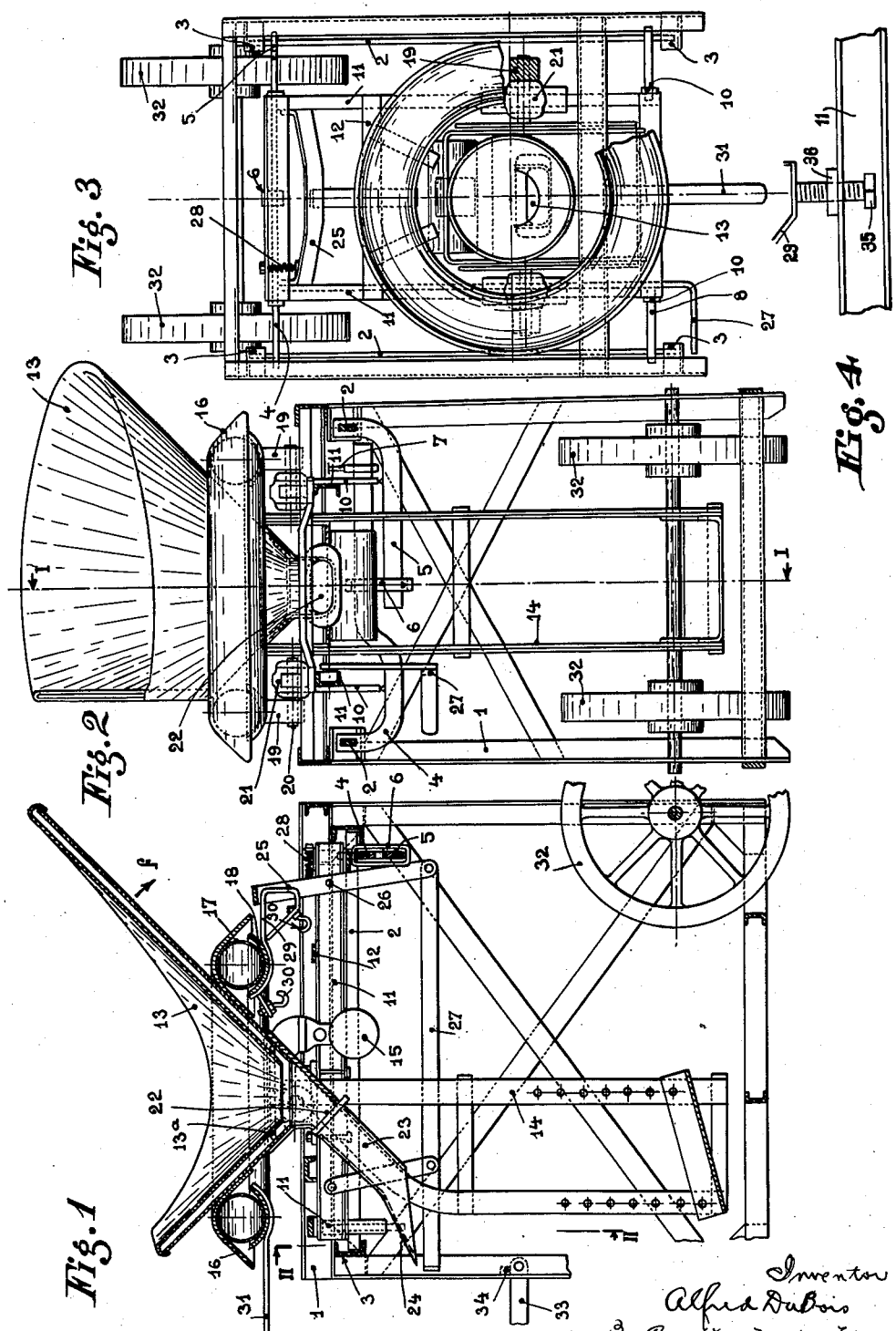
Inventor
Alfred DuBois
By Pennie Davis Marvin & Edmonds
Attorneys Patented Dec. 27, 1938

2,141,738

UNITED STATES PATENT OFFICE 2,141,738

FILLING AND WEIGHING MACHINE

Alfred Du Bois, Paris, France

Application March 12, 1936, Serial No. 68,400
In France June 24, 1935

16 Claims. (Cl. 226—48)

The object of my invention is to provide a machine by which a receptacle can be filled by gravity with any granular, powdered or piecemeal material, in a dry or moist state, while at the same time providing optionally for the weighing of the material during the filling operation.

The filling and weighing machine, the subject-matter of my invention, essentially comprises, in combination, the following devices: a weighing mechanism supporting a carrier for a receptacle; an inclined convergent channel which is mounted in such manner as to be capable of vibrating and is adapted to receive the material to be packed and to allow it to slide by gravity into the receptacle placed on its carrier; a vibrator which is rigidly connected to the said channel in order to impart vibrations to it and thereby facilitate the slide of the material; a suspension or device capable of damping vibrations and serving to isolate the vibrating channel from the weighing mechanism as concerns the vibrations; and a main frame supporting the whole of the above-mentioned devices.

Owing to the vibrations imparted to the channel, the said machine will serve for the filling of a receptacle, at high speed, with materials of a widely varying nature, and even with materials which are recognized as being the most difficult to be sacked, and due to the presence of the suspension, such vibrations will not disturb the operation of the weighing mechanism.

The five elements above mentioned, whose combination is the pith of my invention, may be associated in many different ways, thus producing machines which are apparently different but which are none the less modified embodiments of the same inventive idea which consists essentially in the aforesaid combination of elements.

For instance, the vibrating channel may be supported by means of the suspension, either by the main frame or by the weighing mechanism, or on the other hand, the vibrating channel supports the weighing mechanism by means of the suspension. In the last two cases, the carrier for the receptacle may be suspended directly from the weighing mechanism, or from the vibrating channel. The damping device may also be mounted between the weighing mechanism and the main frame, and in this case the latter would directly support the vibrating channel. In this latter case, like the first, the carrier for the receptacle will necessarily be mounted directly upon the weighing mechanism.

Various details of the invention, which are important but not essential, irrespectively of the manner in which the essential elements are combined, will appear from the following description of an embodiment of my invention and be more fully pointed out in the claims.

The embodiment hereinafter described is designed for the filling of valve-bags, but it is to be understood that the most of the features of this embodiment may also be used in a machine designed to fill any other kind of receptacle such as an open sack, a barrel, a box, etc.

In the drawing:

Fig. 1 is an elevational view, showing the machine in section on the line I—I of Fig. 2.

Fig. 2 is a corresponding side view, with section on the line II—II of Fig. 1.

Fig. 3 is a plan view, with the hopper removed and with parts broken away.

Fig. 4 is a view of an adjustable stop upon which rests the hopper in its filling position.

In the embodiment illustrated, the machine comprises a frame 1, having the form of a rectangular parallelopiped, which is built of section iron bars. The said frame carries at the upper part the weighing mechanism, which consists of two parallel horizontal bars 2, located on the sides of the frame and mounted by means of knife-edges, upon brackets 3 consisting of sections of channel bar secured to the frame. The knife-edges are mounted in such manner that the bars 2 can swing transversely. Two levers 4 and 5, which are located in a common transverse plane at one end of the frame and are turned towards each other, are carried respectively by the said bars, to which they are rigidly secured. The upper lever 4 carries, by means of a knife-edge, a forked bracket 6, and the lower lever 5 rests upon the bottom of said bracket, also through the medium of a knife-edge. A bar or rod 7 connects the free end of the lever 4 to a scale-beam (not shown). At their other ends, the said bars 2 carry respectively two other transverse levers 8, which are shorter.

These four levers 4—5—8 support respectively, by means of knife-edges, four uprights 10, the whole being arranged in such way that the four points of oscillation of the said stays on the corresponding levers shall be located in the same horizontal plane and at the same distance from the swinging axes of the bars 2. The said uprights 10 are secured at their upper part to the ends of a horizontal rectangular frame 11 built of section iron bars and suitably braced by cross-pieces 12. Thus the frame 11 always remains in the horizontal position, and it is exactly equivalent to the platform of a scale.

On the other hand, the machine illustrated comprises as proper filling means a device consisting of an inclined channel 13, having the form of a tapered hopper, a bag-carrier 14 rigidly secured to said hopper 13 preferably by welding, and a vibrator 15 which is also rigidly secured to the hopper. The said vibrator 15 is preferably situated near the outlet of the hopper. To the hopper 13 is secured an annular member 16 forming a kind of trough with the concave side downward, and surrounding the said hopper. The trough-shaped member 16 caps the upper part of an annular suitably inflated air chamber 17 made of rubber and resting at its lower part upon another trough-shaped member 18 having its concave side upward and carried by the frame 11. The two concave members 16 and 18 are not in contact, but the upper member 16 is spread out to a greater degree than the lower member, and it extends outwardly in such way as to project beyond the outer edge of the latter, thus affording a protecting covering which prevents dust and dirt from accumulating in the lower member 18. This latter rests upon the frame 11 by means of two uprights 19 in diametrically opposite position, each of which is traversed by a respective horizontal shaft 20 journaled in a bearing 21 which is bolted to the frame 11. These two shafts 20 are in line, and thus the above-mentioned device is adapted to pivot about a horizontal axis.

The axis of the outlet 22 of the hopper is inclined from the vertical, and said outlet is extended by an oblique tube 23 to a point near the side of the frame which is opposite the side at which the scale-beam of the weighing mechanism is located. The tube 23 is provided with an extension 24 whose upper surface is less inclined than the axis of the tube, so that in the normal filling position, this surface is substantially horizontal, thus permitting its ready insertion into the valve of a valve bag.

The aforesaid filling device is so designed that when it is empty it will turn in the direction of the arrow f and will thus be maintained by its own weight in the normal filling position, which is determined in this case by the engagement of said device with the frame 11, but when the bag is almost full, the centre of gravity proceeds to the other side of the pivoting axis, and the device will now turn in the contrary direction to f. This tipping movement is limited by a stop 25, which herein consists of a strap pivoted at 26 to the frame 11 so as to be capable of turning about a horizontal axis. The said stop can be operated from a distant point by the workman, by the use of a controlling bar 27, and a spring 28 tends to maintain it in the path of an appendage 29 mounted on the tipping filling device.

The said stop which determines the position of the empty tipping filling device due to its own weight, may be an adjustable stop; for instance it may consist of a threaded rod 35 screw-threaded in a stationary nut 36 secured on the frame, thereby enabling to vary at will the inclination of the channel according to circumstances, in particular according to the materials to be packed.

The hopper 13 has a double wall and the inner wall is separated from the outer wall by an air cushion, or other material which will not transmit the vibrations, these two parts being only joined together along the upper edge of the hopper. The inner wall descends to the point at which the vibrator 15 is secured to the outer wall of the hopper 15. Thus the vibrations due to the vibrator 15 will proceed through the upper edge of the hopper to attain the inner wall upon the whole surface of which they will then be propagated in the downward direction, i. e., in the direction favorable for the exit of the material placed in the hopper, and not in the upward direction, as would be the case if the hopper had only a single wall. However, the inner wall need not extend upon the whole height of the hopper, but only upon a part of this height above the level of the vibrator 15. The spacing between the two walls may be advantageously maintained by the interposition of a pneumatic cushion 13a between the two walls, and preferably adjacent the lower end of the inner wall.

The operation of the said machine is as follows. The material is placed in the hopper 13 either by mechanical means, such as a conveyor of any kind, or by a hand-shovel, and it slides directly into the bag placed on the bag-carrier 14. In order to facilitate the filling by the shovel, the hopper 13, as shown in the drawing, may be cut out at the side. When the bag is nearly full, its weight causes the device consisting of the bag-carrier and the hopper to tip about its pivoting axis, into the position determined by the stop 29. The inclination of the carrier and bag at this time will facilitate the filling of the upper corner of the bag opposite the one at which the tube is inserted. When the bag is entirely filled with the required weight of material, the workman draws upon the controlling bar 27, and this will turn the stop 25, against the action of the spring 28, so that the whole pivoting device may turn farther in the contrary direction to f, thus increasing the inclination of the bag-carrier and facilitating the removal of the bag from the tube 23. In order that the workman may temporarily increase this inclination if necessary, he may have within reach a lever 31 which he may operate in order to pivot the device. When the bag has been removed, the tipping device turns in the direction of f by its own weight, and makes contact with the stop 25 which the reaction spring 28 has again brought upon the path of the tipping device after the workman has released the controlling bar 27. The return of the tipping device to the normal position will only take place when the stop 25 has been moved aside by a positive traction effected by the workman upon the controlling bar 27, after which the machine is ready for the next operation.

Whatever may be its construction, the said machine, the subject-matter of the invention, may have the form of a stationary or a portable machine, which latter construction is shown in the drawing, and herein the main frame 1 is mounted, on the side next the weighing mechanism, upon two wheels 32, and the frame carries on the other side two pivoting arms 33 which are stopped in the suitable position in order that they may serve as carrying arms.

Obviously, the said invention is not limited to the details of construction herein described and represented, which are given solely by way of example.

What I claim is:

1. In a filling machine, a receptacle-carrier, an inclined channel adapted to receive the material to be packed and arranged to direct same to the receptacle carrier, means fixedly connecting the carrier to the channel thereby forming an aggregate, means tiltably supporting said aggregate, means holding same in a defined position, the center of gravity of the aggregate being on one side of the tilting axis until a receptacle on the receptacle-carrier is almost filled with a predetermined weight of material, and on the opposite side of the tilting axis when the receptacle is filled, an abutment placed in the path of the aggregate so that the empty aggregate will rest freely upon it, a second abutment also provided in the path of aggregate but oppositely disposed in order that the aggregate carrying a filled receptacle will bear upon it and be held thereby in a definite position, a movable stop member also provided in the path of the aggregate to hold the latter in a position intermediate the extreme positions corresponding to said abutments and adapted to be moved out of said path to allow free movement of the aggregate, spring means urging said stop member to its operative position and a control member actuatable at will and connected to said stop member to control the position thereof.

2. A filling machine including a receptacle carrier, an inclined channel adapted to receive the material to be packed and arranged to direct same to the receptacle-carrier, a vibrator rigidly carried by the lower part of said channel to impart vibrations to the channel which has a double wall at least from its upper part to the vibrator, the inner wall being separated from the outer wall by a medium substantially unable to transmit vibrations and said walls being connected together solely at their upper edge.

3. A filling machine as in claim 2, further including an air inflated bag locally interposed between the inner and outer channel walls to maintain their spacing.

4. A valve-bag filling machine including a bag carrier, an inclined channel adapted to receive the material to be packed and direct same to the bag carrier, an inclined rectilinear tubular extension of said channel at the lower part thereof and adapted to obliquely enter the valve of a valve bag placed in position on the bag carrier, said extension further carrying a forward projection the upper part of which is substantially horizontal to engage the inner side of the bag valved bottom, a vibrator rigidly connected to said channel to impart vibrations thereto and vibration damping means to support said channel.

5. A valve-bag filling machine as in claim 4, wherein the vibration damping means include an annular trough-shaped member, a damping ring resting in said member and another trough-shaped member resting upon said ring and not in contact with the lower one.

6. A valve-bag filling machine as in claim 4, further including vibration transmitting means connecting the bag carrier to the channel.

7. A valve-bag filling machine as in claim 4, wherein the vibration damping means include an annular trough-shaped member, an air inflated annular bag resting in said member and an other trough-shaped member resting upon said air bag and not in contact with the lower one.

8. A valve-bag filling machine as in claim 4, wherein the vibration damping means include a horizontal disposed annular trough-shaped member, a damping ring resting in said member and an other trough-shaped member resting upon said ring and not in contact with the lower one and having its wall extended outwardly and downwardly at some distance from the air bag to form a protecting covering of the lower trough.

9. A filling machine including a receptacle carrier, an inclined channel adapted to receive the material to be packed and arranged to direct same to the receptacle-carrier, a vibrator carried by said channel and adapted to impart vibrations thereto, and vibration damping means to support said channel, said means including a lower trough shaped member, damping member resting in said trough and an upper trough-shaped member resting on said damping member and not in contact with the lower one.

10. A filling machine including a receptacle carrier, an inclined channel adapted to receive the material to be packed and arranged to direct same to the receptacle carrier, a vibrator carried by said channel and adapted to impart vibrations thereto, and vibration damping means to support said channel, said means including a lower trough shaped member, an air inflated bag resting in said trough and an upper trough-shaped member resting on said bag.

11. A valve bag filling machine including a bag carrier, an inclined channel adapted to receive the material to be packed and direct same to the bag carrier, an inclined rectilinear tubular extension of said channel at the lower part thereof and adapted to obliquely enter the valve of a valve bag placed in position on the bag carrier, said extension further carrying a forward projection the upper part of which is substantially horizontal to engage the inner side of the bag valve bottom, a vibrator carried by and rigidly connected to said channel to impart vibrations thereto and vibration damping means to support said vibrating channel.

12. A valve bag filling machine as in claim 11, further including means tiltable about a substantially horizontal axis and supporting both said vibration damping means, the vibrating channel and the bag carrier, whereby is provided an aggregate tiltable as a whole, and means forming an abutment engageable by said aggregate to thereby hold the latter in its filling position.

13. A valve bag filling machine as in claim 11, further including means tiltable about a substantially horizontal axis and supporting both said vibration damping means and the vibrating channel, whereby is provided an aggregate tiltable as a whole, the vibrating part of said aggregate rigidly carrying the bag carrier, and means forming an abutment engageable by said aggregate to thereby hold the latter in its filling position.

14. A bag filling machine for piecemeal or powdered material, including a tubular channel adapted to convey the material to a receptacle to be filled, a vibrator secured onto said channel to vibrate the latter, vibration damping means to support said channel and means to feed said channel with a flow of the material.

15. A bag filling machine for piecemeal or powdered material, including a tubular channel adapted to convey the material to a receptacle to be filled, vibrating means connected to said channel to vibrate the latter, vibration damping means to support said channel, and means to feed said channel with a flow of the material.

16. In a valve bag filling machine, a convergent channel or hopper adapted to receive the material to be packed, a straight inclined tubular extension of said channel provided at the lower part of the latter and having its delivery end adapted to be inserted into a valve bag through its valve, the passageway thus provided by this extension being throughout rectilinear from the channel to the delivery mouth of said extension and the insertable portion of said inclined tubular extension carrying beyond its delivery mouth a forward projection the upper part of which is substantially horizontal to engage the inner side of the bag valved end, so that the latter may be held in a substantially vertical filling position while the inclined tubular extension is inclined with reference to the bag valved end.

ALFRED DU BOIS.